US011162835B2

(12) United States Patent
Kim et al.

(10) Patent No.: US 11,162,835 B2
(45) Date of Patent: Nov. 2, 2021

(54) WEIGHT MEASURING APPARATUS FOR VEHICLES

(71) Applicant: CAS Corporation, Yangju-si (KR)

(72) Inventors: Dong Jin Kim, Seoul (KR); Tae In Kim, Seoul (KR)

(73) Assignee: CAS Corporation, Yangju-Si (KR)

( * ) Notice: Subject to any disclaimer, the term of this patent is extended or adjusted under 35 U.S.C. 154(b) by 0 days.

(21) Appl. No.: 17/000,939

(22) Filed: Aug. 24, 2020

(65) Prior Publication Data

US 2021/0102834 A1    Apr. 8, 2021

(30) Foreign Application Priority Data

Oct. 7, 2019 (KR) .......................... 10-2019-0123721

(51) Int. Cl.
| | |
|---|---|
| *G01G 23/00* | (2006.01) |
| *G01G 19/02* | (2006.01) |
| *G01G 3/14* | (2006.01) |
| *G01G 21/23* | (2006.01) |
| *G01G 23/36* | (2006.01) |

(52) U.S. Cl.
CPC ............ *G01G 19/027* (2013.01); *G01G 3/14* (2013.01); *G01G 21/23* (2013.01); *G01G 23/005* (2013.01); *G01G 23/361* (2013.01)

(58) Field of Classification Search
CPC ........ G01G 19/027; G01G 3/14; G01G 21/23; G01G 23/005; G01G 23/361; G01G 21/28

See application file for complete search history.

(56) References Cited

U.S. PATENT DOCUMENTS

| | | | | |
|---|---|---|---|---|
| 4,281,728 A | * | 8/1981 | Dickason ............. | G01G 19/027 177/134 |
| 4,726,435 A | * | 2/1988 | Kitagawa .............. | G01G 23/06 177/154 |
| 4,804,052 A | * | 2/1989 | Griffen ............... | G01G 19/021 177/25.14 |
| 5,894,112 A | * | 4/1999 | Kroll ..................... | G01G 19/07 177/134 |

(Continued)

FOREIGN PATENT DOCUMENTS

| | | |
|---|---|---|
| KR | 20-2008-0001784 U | 6/2008 |
| KR | 10-1008845 B1 | 1/2011 |

(Continued)

*Primary Examiner* — Randy W Gibson
(74) *Attorney, Agent, or Firm* — Novick, Kim & Lee, PLLC; Jae Youn Kim; Jihun Kim (57) ABSTRACT

A weight measuring apparatus for vehicles includes a measuring plate on which an object to be measured is placed; a plurality of entry members installed on the measuring plate; and a load cell having one side fixed to the entry member and the other side fixed to the measuring plate, wherein the entry members are installed apart from each other at the edge of the measuring plate. A weight measuring apparatus for vehicles with which a vehicle is easy to enter thereby measuring the weight of the vehicle conveniently, of which structure is simple and light thereby improving the usability and handling thereof, of which cost for manufacturing can be reduced, of which supporting structure is stable and reinforced with structural strength thereby improving durability and safety, and that can measure load weight accurately.

9 Claims, 12 Drawing Sheets

(56) References Cited

U.S. PATENT DOCUMENTS

| | | | |
|---|---|---|---|
| 9,612,150 B2* | 4/2017 | Perrea | G01G 21/23 |
| 2006/0180360 A1* | 8/2006 | Sikula | G01G 21/23 |
| | | | 177/201 |

FOREIGN PATENT DOCUMENTS

| | | |
|---|---|---|
| KR | 10-1712057 B1 | 3/2017 |
| KR | 10-2017-0037249 A | 4/2017 |
| WO | 2009/074865 A1 | 6/2009 |

* cited by examiner

FIG. 1A

Prior Art

WEIGHT MEASURING APPARATUS FOR VEHICLES

CROSS REFERENCE TO RELATED APPLICATION

The present application claims priority to Korean Patent Application No. 10-2019-0123721, filed on Oct. 7, 2019, the entire contents of which are incorporated herein for all purposes by this reference.

BACKGROUND OF THE DISCLOSURE

1. Field of the Disclosure

The present invention relates to a weight measuring apparatus for vehicles, and more particularly, a weight measuring apparatus for vehicles with which a vehicle is easy to enter thereby measuring the weight of the vehicle conveniently, of which structure is simple and light thereby improving the usability and handling thereof, of which cost for manufacturing can be reduced, of which supporting structure is stable and reinforced with structural strength thereby improving durability and safety, and that can measure load weight accurately.

2. Description of the Related Art

Generally, the law regulates so that a vehicle carrying cargo, such as a truck, must not overloads a predetermined weight in order to prevent problems such as a safety accident or damage on the road, and if a driver violates this, certain legal sanctions are imposed, such as adding a fine to the driver.

For example, the Road Act and Road Traffic Act of Korea consider the following vehicles as overloaded vehicles: vehicles passing in a state in which the total weight including the vehicle's own weight and the weight of which the load is put on the road through both of the vehicle's tires exceeds a predetermined standard, and vehicles passing in a state in which the total weight of the vehicle exceeds a predetermined standard. Accordingly, when a vehicle is to be loaded with cargo, a weight measuring apparatus for vehicles is installed at an overload checkpoint and is used to check an accurate loading weight.

As a weight measuring apparatus for vehicles, a technique such as Portable Weight Measurement Equipment for Vehicle disclosed in Korean Utility Model Publication No. 20-2008-0001784 (published date: 2008 Jun. 12) or WEIGHING SYSTEM, PARTICULARLY FOR VEHICLES, TRAILERS OR THE LIKE disclosed PCT Publication No. WO 2009/074865 A1 (published date: 2009 Jun. 18) has been proposed.

Figure 1A:
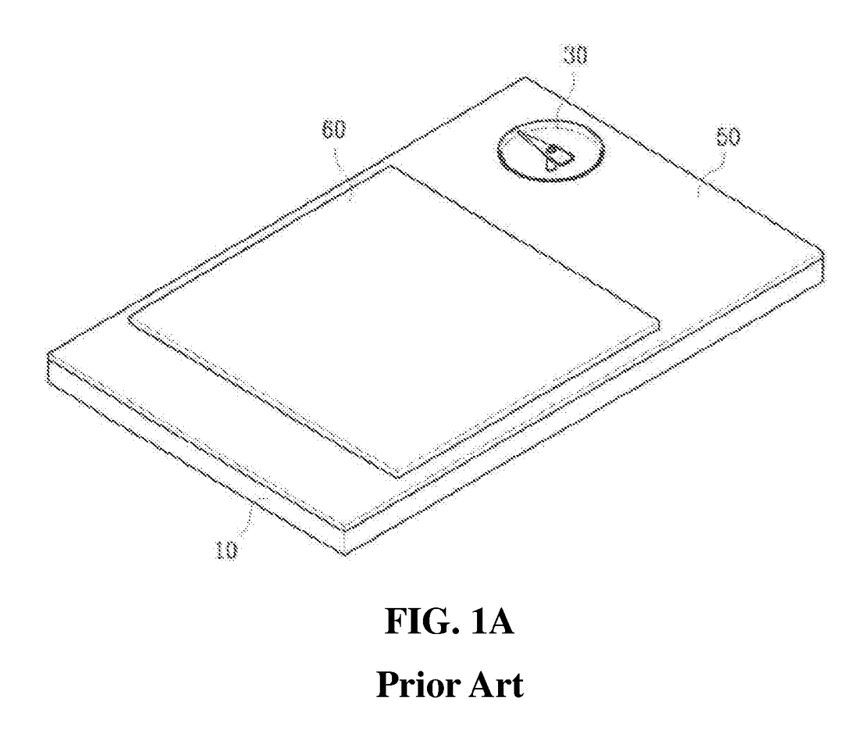
FIG. 1A and FIG. 1B are views for explaining a conventional weight measuring apparatus for vehicles.

In the above-mentioned Korean Utility Model (Korean Publication No. 20-2008-0001784), as shown in FIG. 1A, its overall shape is approximately a square frame shaped, and a vertical bump is formed at its edge area, thereby making it difficult for the tires to enter the apparatus. Since it may sequentially cause an overrun, there is a problem that it is not only inconvenient to measure the load, but also the weight measuring apparatus for vehicles itself scatters during tires entering.

In addition, the weight measuring apparatus for vehicles shown in FIG. 1A has a flaw in that because the entire bottom plane of the base member 10 with a square frame shape is in close contact with the installation floor surface when using the apparatus, the base member 10 tend to be inclined thereby making it difficult to accurately measure the load and causing damage or deformation due to load put to one side, in case that there are irregularities or foreign substances on the installation floor surface.

Figure 1B:
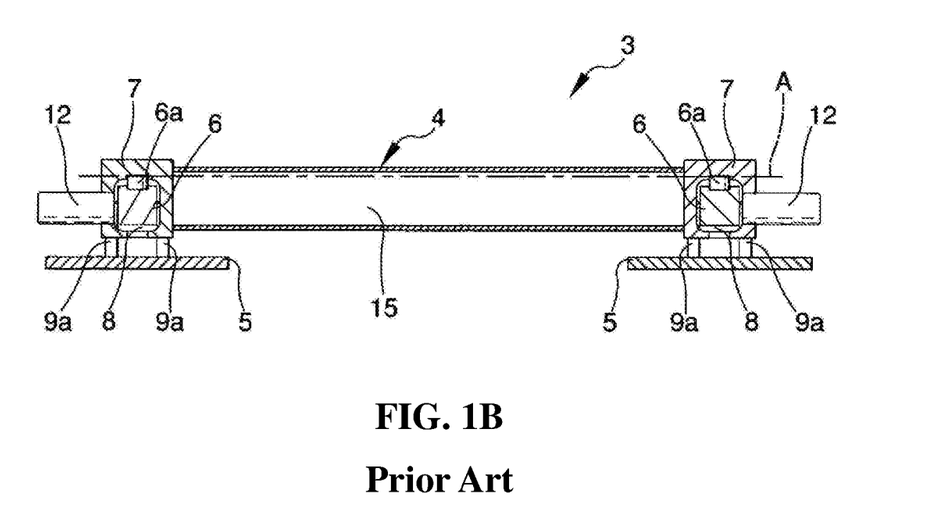

On the other hand, in the above-mentioned the weight measuring apparatus according to PCT published patent (International Publication No. WO 2009/074865 A1), as shown in FIG. 1B, the load cell 6 is installed on the support 9a protruding from the plate 5 and the crossbar 4 is connected to the fitting portion 7 into which the load cell 6 is fitted and the plate-shaped platform (not shown) on which the tires of the vehicle are mounted on the upper part of the crossbar 4 is formed.

There is a problem in that the weight measuring apparatus shown in FIG. 1B has a structure in which the load cell 6 is relatively highly installed on the upper part of the support 9a, so that the height of the weight measuring apparatus becomes high, which makes it difficult for the tires to enter and causes an overrun. In addition, since the distance between the load cells 6 is too far, a relatively large number of components are required, such as requiring a separate crossbar 4, and the structure is too complicated, resulting in high material costs and assembling costs. Therefore, there is a limitation in that since the manufacturing cost increases and there would be more factors to be out of order, the durability is lowered and the usability and handling are lowered due to the increase in the overall load of the weight measuring apparatus.

In addition, there is a problem in that since the weight measuring apparatus shown in FIG. 1B has a structure in which the load of the vehicle is directly transferred to the load cell 6 through the crossbar 4, if a high load is abnormally applied above a predetermined standard, damage or destroy of the load cell is caused.

[Patent Document 1] Korean Utility Model Publication No. 20-2008-0001784 "PORTABLE WEIGHT MEASUREMENT EQUIPMENT FOR VEHICLE"

[Patent Document 2] PCT published Patent International Publication No. WO 2009/074865 A1 "WEIGHING SYSTEM, PARTICULARY FOR VEHICLES, TRAILERS OR THE LIKE"

SUMMARY OF THE INVENTION

The present invention is intended to solve the problems, and an object of the present invention is to provide a weight measuring apparatus for vehicles with which a vehicle is easy to enter and of which structure is simple and light thereby improving the usability and handling of it and reducing the manufacturing cost.

Another object of the present invention is to provide a weight measuring apparatus for vehicles, of which supporting structure is stable and reinforced with structural strength thereby improving durability and safety and enabling accurate load measurement.

For achieving the objects, a weight measuring apparatus for vehicles according to the present invention may include, a measuring plate on which an object to be measured is placed; a plurality of entry members installed on the measuring plate; and a load cell having one side fixed to the entry member and the other side fixed to the measuring plate, wherein the entry members are installed apart from each other at the edge of the measuring plate.

The entry member may include an entry part having a slope for entry of the object to be measured; a supporting part extended from the entry part and located on the lower part of the measuring plate, and formed with a bottom fixing hole; and a load cell accommodation part formed concavely on an upper part of the supporting part so that one side of the load cell is accommodated.

The load cell is formed in a beam shape made of a bar-shaped elastic body where a first cell fastening hole and a second fastening hole are respectively formed on one side and the other side of the load cell and a hollow is formed in the center, and the load cell accommodation part includes a load cell seating place formed in the area where the bottom fixing hole is formed so that one side of the load cell can be seated, and an operating groove part contacted with the load cell seating place and formed concavely so as to form a displacement gap for deformation of the load cell.

The measuring plate comprises a protruded stopper protruded from the edge end of a measuring plate body, and an upper fixing hole to which the other side of the load cell is formed to be fixed, and the entry part comprises a non-slip groove recessed in the slope, and a protrusion seating part recessed in a corresponding position so that the protruded stopper is seated.

The measuring plate body may include a number of reinforcing protrusion parts protruded from the bottom plane to increase rigidity while minimizing thickness; a fixing hole bottom reinforcing part protruded from the bottom plane of the area where the upper fixing hole is formed; a fixing hole upper reinforcing part protruded from the upper plane of the area where the upper fixing hole is formed; and an auxiliary non-slip part formed at an edge area corresponding to the entry part.

The measuring plate comprises a rim part protruded from the bottom plane of the measuring plate body and formed with an outlet, and a storage part provided with a cover member coupled to the rim part.

Further, the entry member comprises a non-slip pad installed on the bottom plane.

The weight measuring apparatus for vehicles according to the present invention may include a controller calculating a weight value based on the electric signal output from the load cell; a user interface receiving a user input and sending the signal to the controller; a display unit displaying data calculated by the controller; and a power supply supplying power to the load cell, the controller, the user interface, and the display unit.

Further, the weight measuring apparatus for vehicles according to the present invention may include a load cell damage prevention part formed on the measuring plate to prevent deformation or damage of the load cell even if an excessive load is applied to the upper plane of the measuring plate.

The load cell damage prevention part may be configured as a safety limiter member formed on the measuring plate so that a gap for buffering is provided between the measuring plate and an upper plane of one side of the load cell.

By the weight measuring apparatus for vehicles according to the present invention, as a measuring plate is provided with an entry member for vehicles to enter easily and a load cell is installed between the entry member and the measuring plate, its structure can be simple and the weight of the measuring device itself can be minimized, so that it can be easily moved, stored and installed, thereby improving the usability and handling.

In particular, the weight measuring apparatus for vehicles according to the present invention has advantages in which due to the structural feature of the distance between load cells being shortened, the supporting structure can be stable, components such as a measuring plate can be configured at a low cost thereby reducing its manufacturing cost, and an accurate load measurement can be achieved.

Further, the weight measuring apparatus for vehicles according to the present invention is provided with a load cell damage prevention part on the binding area of the load cell, so that even if an excessive load is applied to the measuring plate abnormally, it is possible to reduce deformation or damage of the load cell, thereby improving durability and safety.

DETAILED DESCRIPTION OF THE EMBODIMENTS

Hereinafter, preferred embodiments of the present invention will be described in detail with reference to FIGS. 2A to 8, and the same elements are denoted by the same reference numerals in FIGS. 2A to 8.

Meanwhile, the illustration and detailed description of configurations, and operations and effects thereof that may be easily understood by those skilled in the art from general technology in each drawing have been briefly made or omitted. Also, since the present invention has a feature of the weight measuring apparatus for vehicles, the explanation has been focused on the feature and other parts have been briefly made and omitted.

Figure 2A:
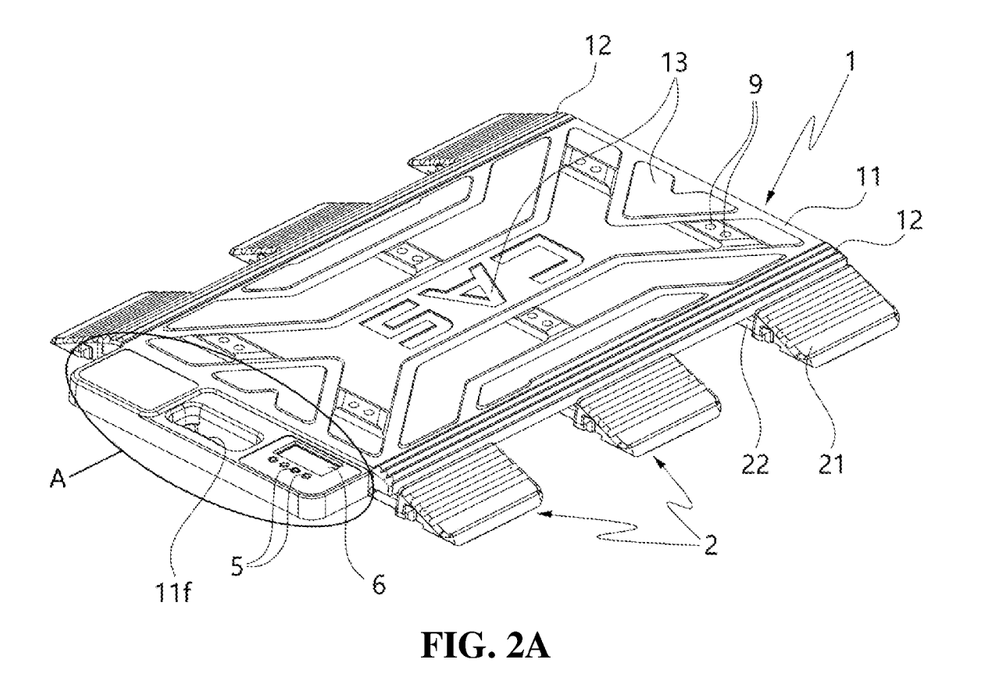
FIG. 2A is a perspective view showing a shape appearing in the plane of the weight measuring apparatus for vehicles according to an embodiment of the present invention.
Figure 2B:
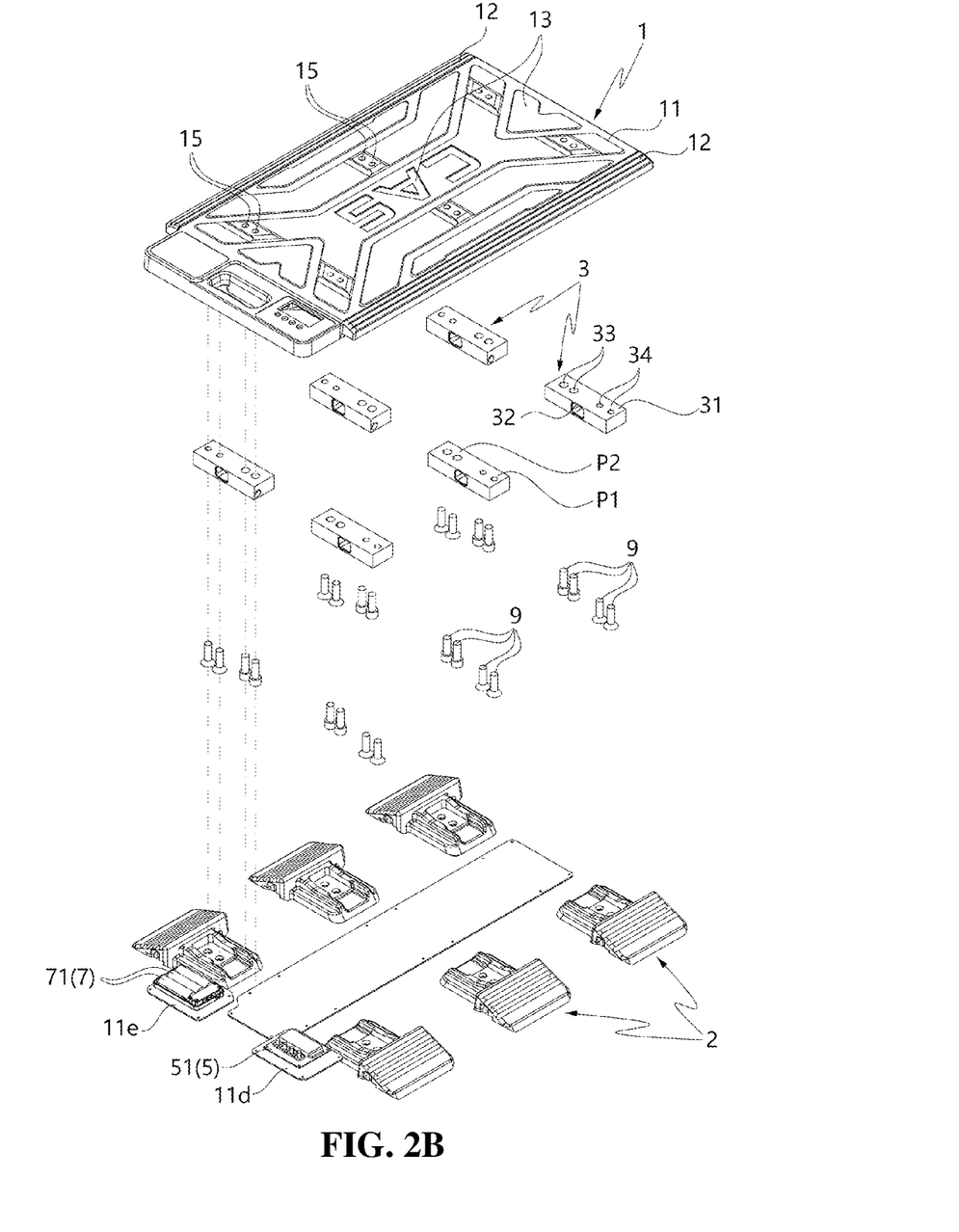
FIG. 2B is an exploded perspective view showing a shape appearing in the plane of the weight measuring apparatus for vehicles according to an embodiment of the present invention.
Figure 3A:
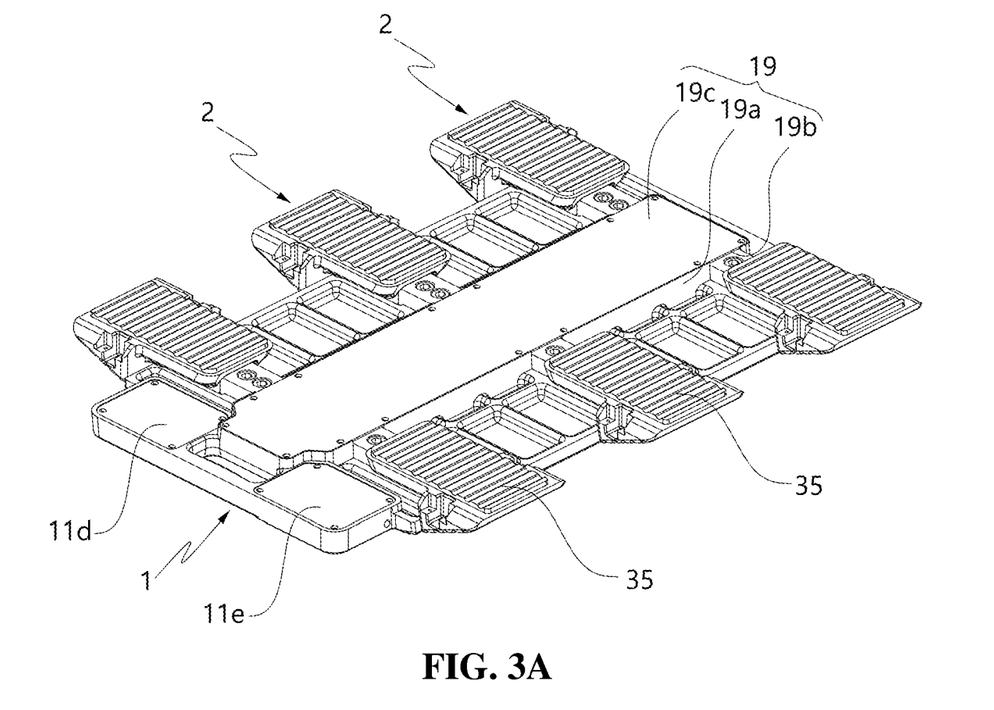
FIG. 3A is a perspective view showing a shape appearing in the bottom plane of the weight measuring apparatus for vehicles according to an embodiment of the present invention.
Figure 3B:
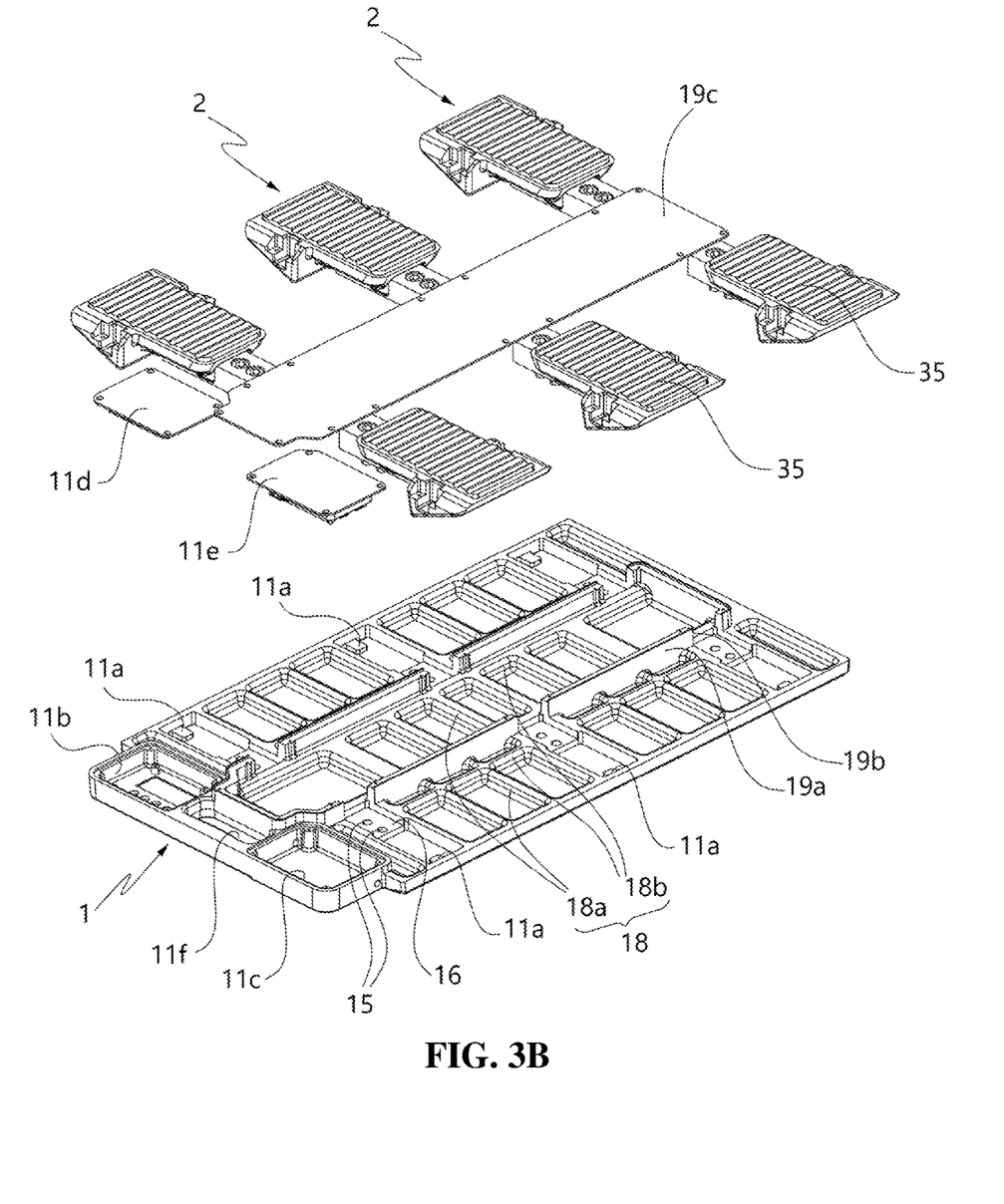
FIG. 3B is an exploded perspective view showing a shape appearing in the bottom plane of the weight measuring apparatus for vehicles according to an embodiment of the present invention.
Figure 3C:
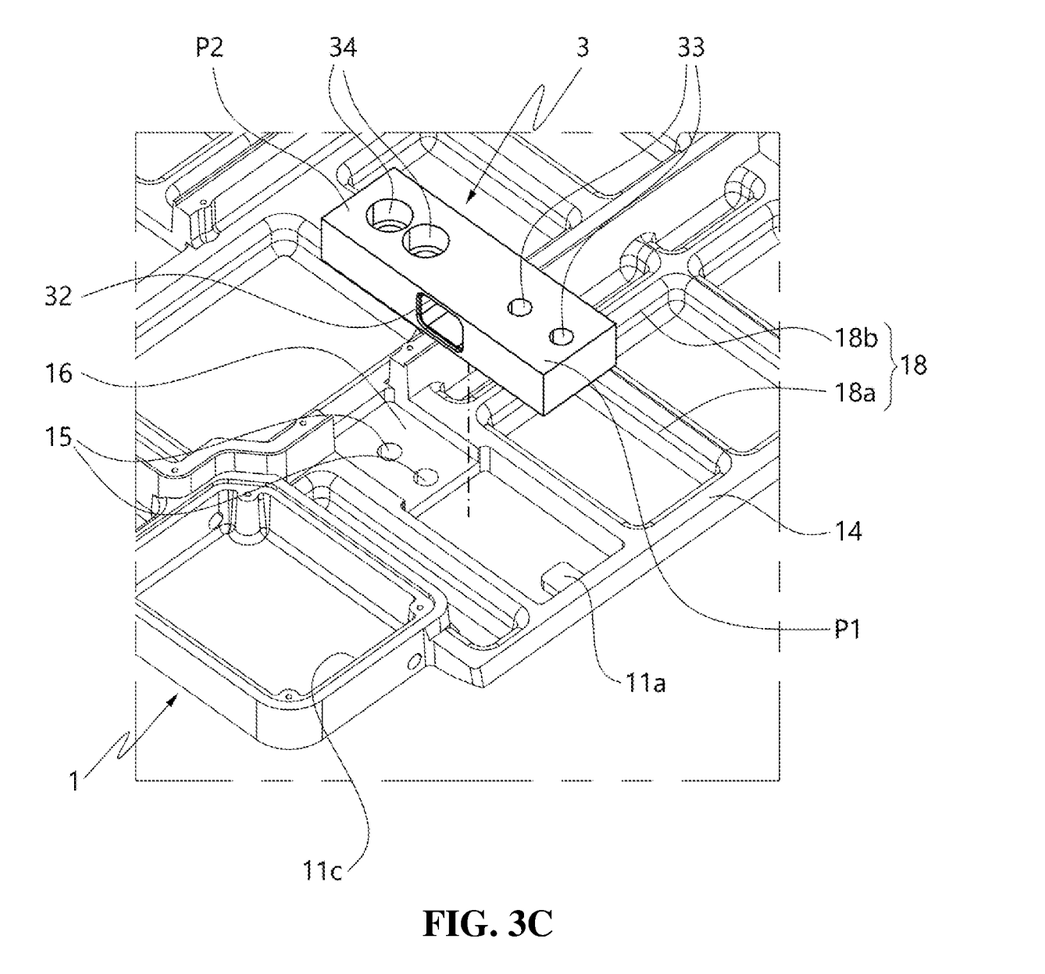
FIG. 3C is a perspective view enlarging main portion of FIG. 3B.
Figure 4:
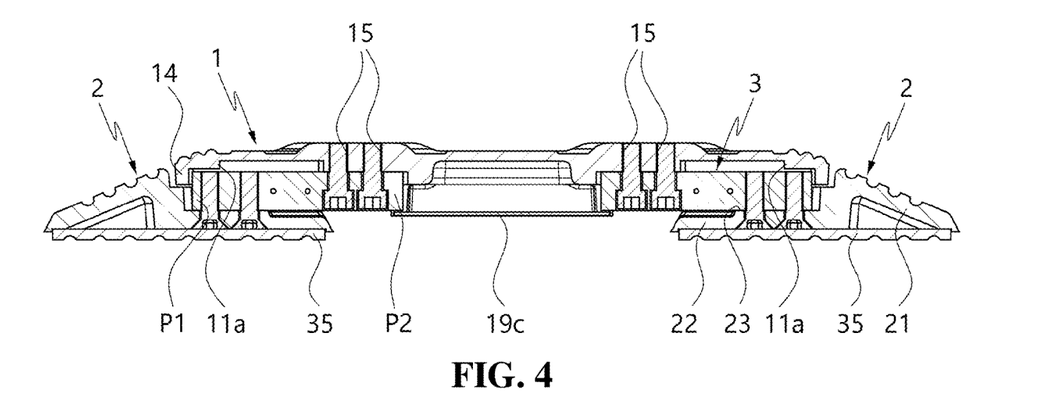
FIG. 4 is a cross-sectional view for explaining the weight measuring apparatus for vehicles according to an embodiment of the present invention.

FIG. 2A is a perspective view showing a shape appearing in the plane of the weight measuring apparatus for vehicles according to an embodiment of the present invention, and FIG. 2B is an exploded perspective view showing a shape appearing in the plane of the weight measuring apparatus for vehicles according to an embodiment of the present invention, and FIG. 3A is a perspective view showing a shape appearing in the bottom plane of the weight measuring apparatus for vehicles according to an embodiment of the present invention, and FIG. 3B is an exploded perspective view showing a shape appearing in the bottom plane of the weight measuring apparatus for vehicles according to an embodiment of the present invention, and FIG. 3C is an enlarged view of main portion of FIG. 3B, and FIG. 4 is a cross-sectional view for explaining the weight measuring apparatus for vehicles according to an embodiment of the present invention.

Referring to FIGS. 2A to 4, the weight measuring apparatus for vehicles according to an embodiment of the present invention comprises a measuring plate 1, an entry member 2 and a load cell 3. It has a major trait in that it has been configured for a vehicle to enter easily, to have a simple structural components and stable supporting structure, and to improve structural rigidity.

The measuring plate 1 is a component on which an object to be measured such as a tire of a vehicle is placed, and the measuring plate 1 is not particularly limited in form or structure as long as it has a structure on which the object can be placed, but it is formed in a plate-like structure in this embodiment.

More specifically, the measuring plate 1 is formed with a measuring plate body 11 formed in an approximately rectangular plate shape; an auxiliary non-slip part 12 formed toward the entry member 2 at the edge area of the measuring plate body 11 and having a plurality of non-slip protrusion parts; and an upper plane embossed part 13 which is formed protruded or concavely on the upper plane of the measuring plate body 11 for displaying the direction of the entry, product brand, etc., while performing a non-slip function.

In addition, as shown in FIGS. 2b to 4, the measuring plate 1 is formed with a protruded stopper 14 protruded downward from the edge end of the auxiliary non-slip part 12; a plurality of upper fixing holes 15 formed so that the other side of the load cell 3 is fixed to; a fixing hole bottom reinforcing part 16 protruded from the bottom plane of the region formed with the upper fixing hole 15; and a fixing hole upper reinforcing part 17 protruded from the upper plane of the region formed with the upper fixing hole 15.

Also, the measurement plate 1 has a number of reinforcing protrusion parts 18 protruded from the bottom plane to increase the rigidity against the load while minimizing the thickness of the measuring plate body 11.

The reinforcing protrusion part 18 is not particularly limited in shape as long as it may increase the rigidity of the measuring plate 1. For example, as shown in FIG. 3B, the reinforcing protrusion part 18 has a structure that a plurality of transverse protrusion parts 18a and longitudinal protrusion parts 18b are protruded from the bottom plane of the measuring plate body 11 and are connected to each other to form an approximately latticed shape.

In addition, a storage part 19 is formed on the bottom plane of the measuring plate body 11 in order to store a cable (not shown) connected to the load cell 3, etc.

The storage part 19 is composed of a rim part 19a protruded in the longitudinal and transverse directions from the bottom plane of the measuring plate body 11 and having an outlet 19b; and a cover member 19c coupled to the rim part 19a.

In addition, a handle hole 11f that the user can hold during use and handling is formed on one side of the measuring plate body 11 of the measuring plate 1.

Figure 5:
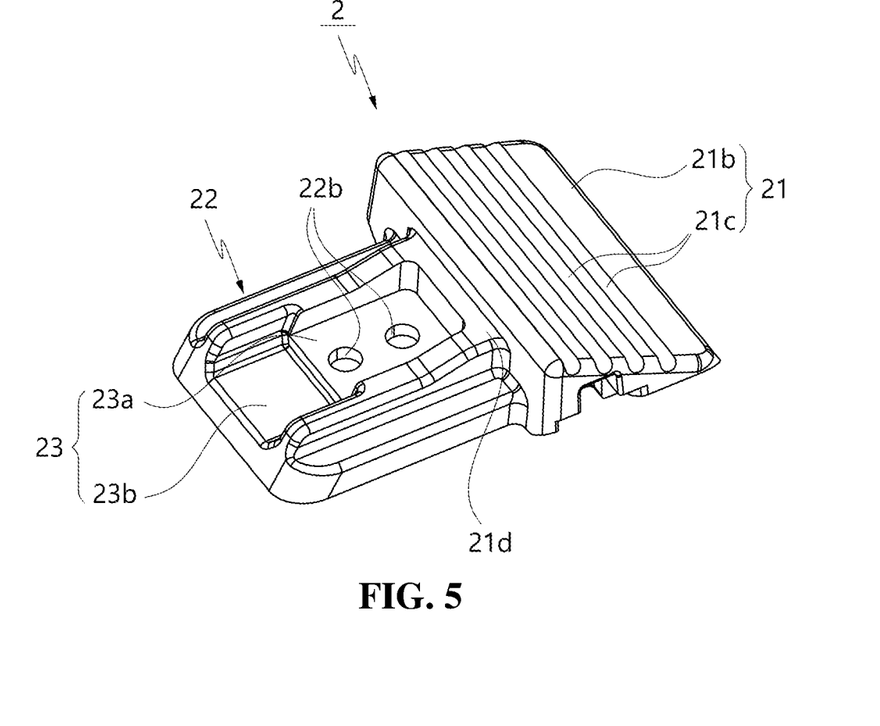
FIG. 5 is a perspective view showing an entry member of the weight measuring apparatus for vehicles according to an embodiment of the present invention.

FIG. 5 is a perspective view showing the entry member of the weight measuring apparatus for vehicles according to an embodiment of the present invention.

Referring to FIGS. 2A to 5, the entry member 2 is installed on the edge part of the measuring plate to facilitate the entry process of a vehicle to the upper plane of the measuring plate 1 and a plurality of entry members are installed apart from each other at the edge of the measuring plate 1.

The installation of the entry member 2 is not particularly limited in the number, distance from each other and position, but they are preferably installed so as to face each other along longitudinal direction of the measuring plate 1. As shown in FIG. 2A, six entry members 2 or four entry members 2 may be arranged facing each other.

Figure 6:
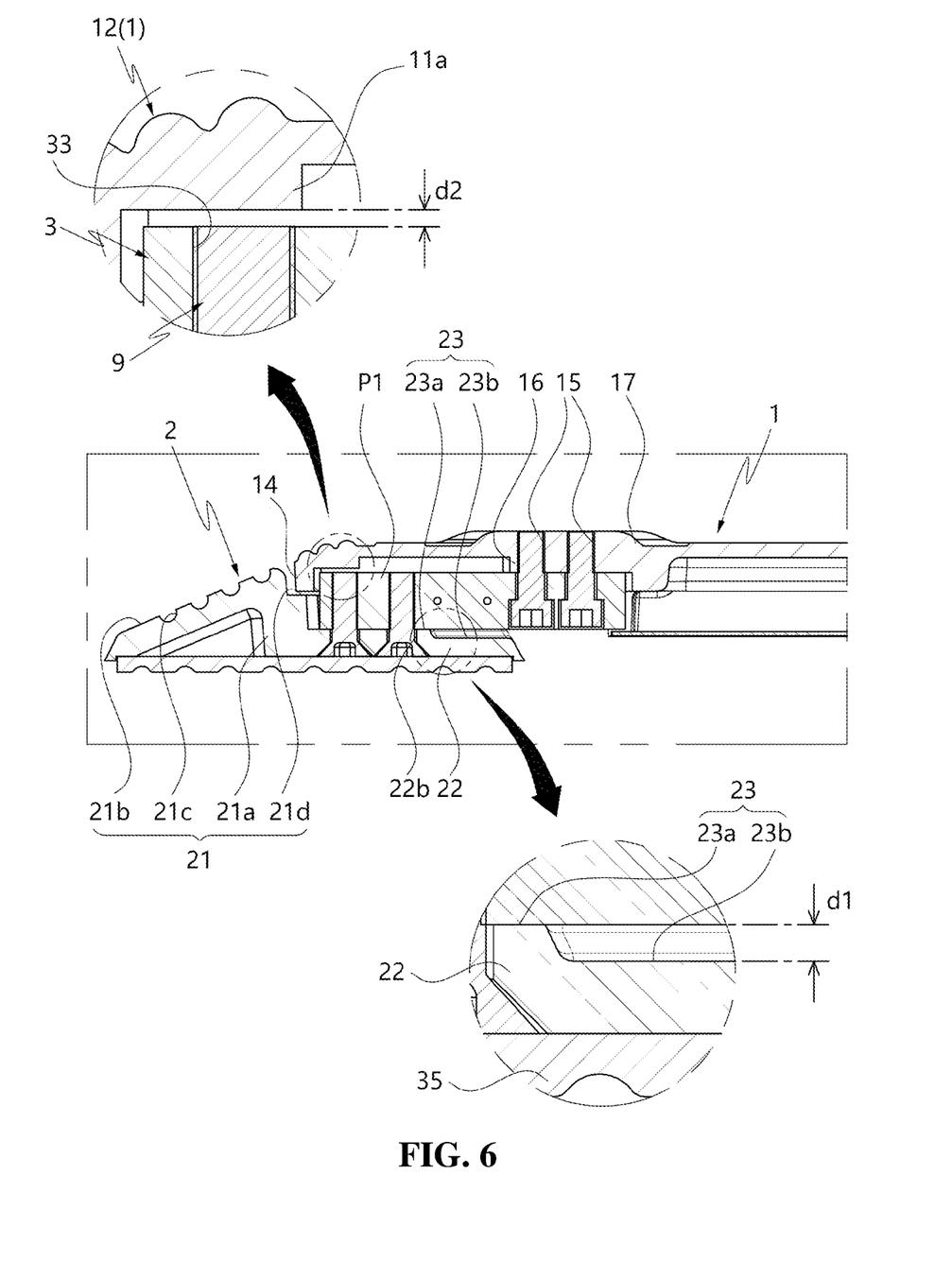
FIG. 6 is a cross-sectional view enlarging main portion of FIG. 4.

More specifically, as shown in FIGS. 4 to 6, the entry member 2 includes an entry part 21 where the object to be measured enters, a supporting part 22 supporting the object to be measured, and a load cell accommodation part 23 formed to accommodate the load cell 3.

The entry part 21 is formed to contact the edge area of the measuring plate body 11 for the object to be measured, such as a wheel, to enter. The entry part 21 includes an entry part body 21a on which a slope 21b is formed, a non-slip groove 21c recessed in the slope 21b, and a protrusion seating part 21d recessed in a corresponding position so that the protruded stopper 14 of the measuring plate 1 is seated on.

The supporting part 22 is a portion extended from the entry part 21 so as to be located on the lower part of the measuring plate 1, and it is provided with a plurality of bottom fixing holes 22b which a fastening member 9 fastened to a first cell fastening hole 33 of the load cell 3 is inserted into.

The load cell accommodation part 23 is an accommodating groove part formed concavely on an upper part of the supporting part 22 so that one side of the load cell 3 is accommodated, and it includes a load cell seating place 23a formed so that a bottom plane of one side p1 of the load cell 3 can be seated in the region where the bottom fixing hole 22b of the supporting part 22 is formed.

In addition, the load cell accommodation part 23 is provided with an operating groove part 23b on which the other side p2 of the load cell 3 is located while corresponding to the load applied on the upper plane of the measuring plate body 11.

The operating groove part 23b is in contact with the load cell seating place 23a of the load cell accommodation part 23 and is recessed downward to form a step with the load cell seating place 23a. When a load is applied from the object to be measured, the operating groove part 23b forms a displacement gap d1, which is a space in which the other side of the load cell 3 moves.

In addition, the entry member 2 is provided with a non-slip pad 35 so that the entry member 2 is not easily moved while being seated on the mounting surface. The non-slip pad 35 is made of a material having a large coefficient of friction, such as rubber, is coupled to the bottom plane of the entry member 2, is shaped corresponding to the shape of the bottom surface of the entry member, and is provided with a plurality of irregularities.

As shown in FIGS. 4 and 6, the load cell 3 is to sense the load of the object to be placed on the measuring plate 1, and it is installed such that one side thereof p1 is fixed to the entry member 2 and the other side thereof p2 is fixed to the measuring plate 1. The load cell 3 detects the load of the object on the measuring plate 1, converts the load into an electrical signal, and outputs it.

In addition, the load cell 3 is formed in a beam shape and it is provided with a first cell fastening hole 33 and a second cell fastening hole 34 respectively formed on one side p1 and the other side p2 of the bar-shaped elastic body 31 and a hollow part 32 formed in the center, wherein a strain gauge is installed on the bar-shaped elastic body. The bar-shaped elastic body 31 is deformed according to the load of the object to be measured, and the strain gauge expands or contracts according to the deformation of the elastic body. A change in the electrical resistance value of the strain gauge occurs and the strain gauge outputs an electrical signal.

FIG. 6 is a cross-sectional view showing an enlarged main portion of FIG. 4.

Referring to FIG. 6, the weight measuring apparatus for vehicles according to an embodiment of the present invention includes a load cell damage prevention part to prevent deformation or damage of the load cell even if an excessive load is applied to the upper plane of the measuring plate 1 abnormally.

The load cell damage prevention part is configured as a structure in which a safety limiter member 11a is formed on a bottom plane of a position corresponding to an upper plane of one side p1 of the load cell 3 on the measuring plate 1, but is not particularly limited in the structure and it may be configured in various structures or shapes as long as it may prevent deformation or damage of the load cell 3.

More specifically, as shown in FIGS. 3C and 6, the safety limiter member 11a protrudes in a structure having a contact plane on the bottom plane of the measuring plate body 11 and with a height having a gap for buffering d2 which can function as a buffer zone for displacement of the load cell 3 between the safety limiter member 11a and the upper plane of one side p1 of the load cell 3. That is, the safety limiter member 11a protrudes downward so that the contact plane of the safety limiter member 11a facing the upper plane of the one side p1 of the load cell 3 is above the surface of the fixing hole bottom reinforcing part 16 where the upper plane of the other side p2 of the load cell 3 is in close contact.

In addition, the spacing between the gap for buffering d2 is not limited to a specific value, but can be configured to be adjusted to a suitable size for protecting the load cell according to the measurement range of the load to be measured or the desired load, the dimensions of the load cell thickness, width, length, etc., the number of load cells installed, the separation distance between the load cells installed together, and the size or weight of the measuring plate and so on.

As described above, when the safety limiter member 11a is provided, even if the other side p2 of the load cell 3 is rapidly displaced downward as an excessive load is applied to the upper plane of the measuring plate 1 abnormally, one side p1 of the load cell 3 is lifted by the gap for buffering d2 through reaction thereby performing a buffering action to prevent cracks or deformation of the load cell. At the same time, the safety limiter member 11a acts to prevent the load cell 3 from being excessively deformed by supporting the load cell 3 such that the upper surface of one side p1 of the load cell 3 is in close contact with the safety limiter member 11a.

Figure 7:
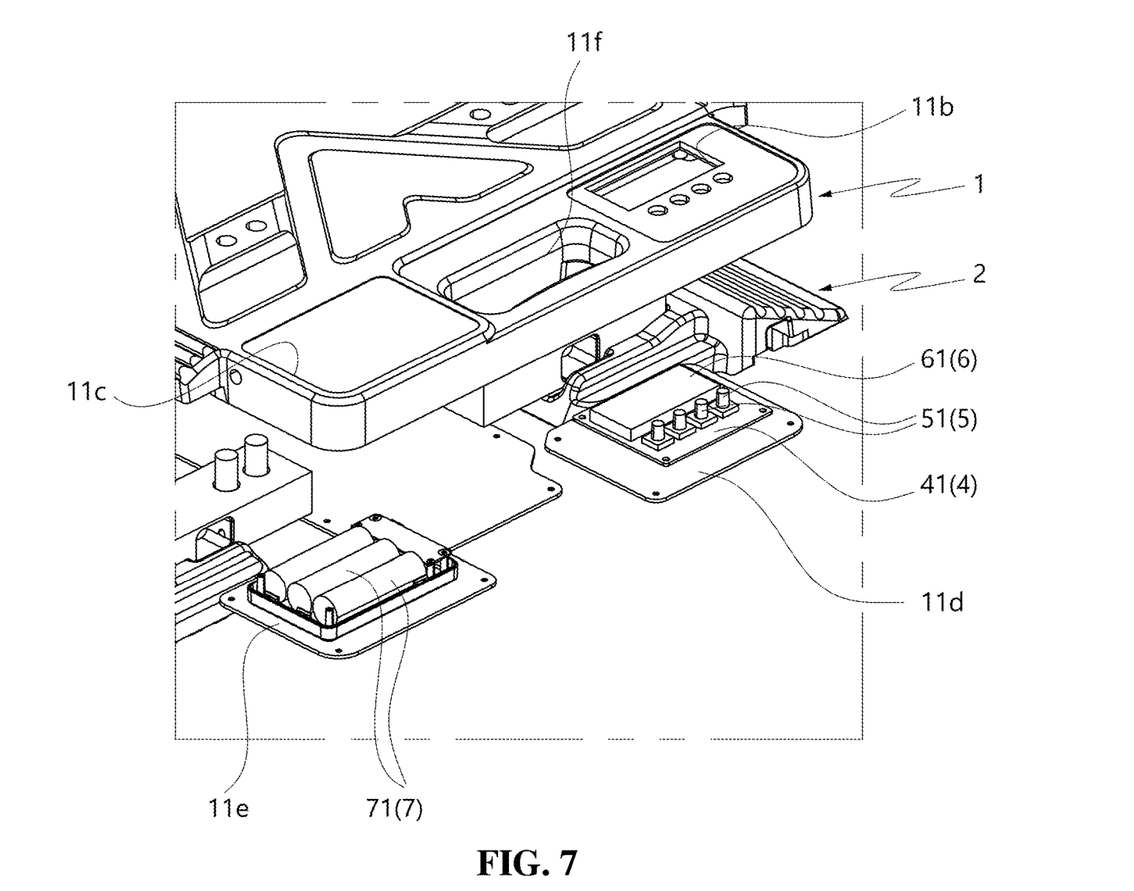
FIG. 7 is an enlarged exploded perspective view of part A of FIG. 2A.

FIG. 7 is an enlarged exploded perspective view of part A of FIG. 2A.

Referring to FIG. 7, the weight measuring apparatus for vehicles according to an embodiment of the present invention comprises a controller 4 that calculates the weight value based on the electric signal output from the load cell, a user interface 5 that receives the user input and send the input signal to the controller 4, a display unit 6 that displays the weight value calculated by the controller 4, and a power supply 7 that supplies power to the load cell 3, the controller 4, the user interface 5, and the display unit 6.

The controller 4 is configured to calculate the weight value of the object placed on the measuring plate 1 based on the electric signal output from the load cell 3. The controller 4 may include a plurality of circuits for amplifying, converting, or filtering electrical signal output from the load cell, an A/D converter for converting signal output from a plurality of circuits into digital signal, and a microprocessor for converting a digital signal from the A/D converter into a weight value of the object to be measured according to a predetermined algorithm. The controller 4 may include software algorithm that executed by the processer, and a memory in which the algorithm is stored.

The plurality of circuits, A/D converter, and microprocessor may be integrated and mounted on one printed circuit board 41. The printed circuit board 41 is sealed and protected safely in a controller cover 11d after being embedded in a controller installation groove 11b provided at the front end of the measuring plate 1 as shown in FIG. 7.

The user interface 5 is connected to and installed on the printed circuit board 41 and may include various input buttons 51 such as on/off buttons and may also include a user interface means other than the buttons, such as a touch panel. The user interface 5 that receives the user input and send a user input signal to the controller 4.

The display unit 6 receives the data such as the weight value from the controller 4 and displays the data. The display unit 6 may include a display panel 61 such as liquid crystal display connected to and installed on the printed circuit board 41 in this embodiment. However, it should not be limited thereto and may be configured as a monitor and the like which is separately installed outside.

The power supply 7 is to supply electric power to be used in the load cell 3, the controller 4, the user interface 5 and the display unit 6. It is embedded in a battery installation groove 11c provided at the front end of the measuring plate 1 and then is sealed by a power supply cover 11e and is safely protected.

In addition, the power supply 7 may include a plurality of batteries 71 as shown in FIG. 7, but it should not be limited thereto, and may be configured as a DC power supply device and the like which invert power supplied from a commercial power supply into a desired current/voltage and supply it.

Hereinafter, an operation of the weight measuring apparatus for vehicles according to an embodiment of the present invention will be briefly described.

Figure 8:
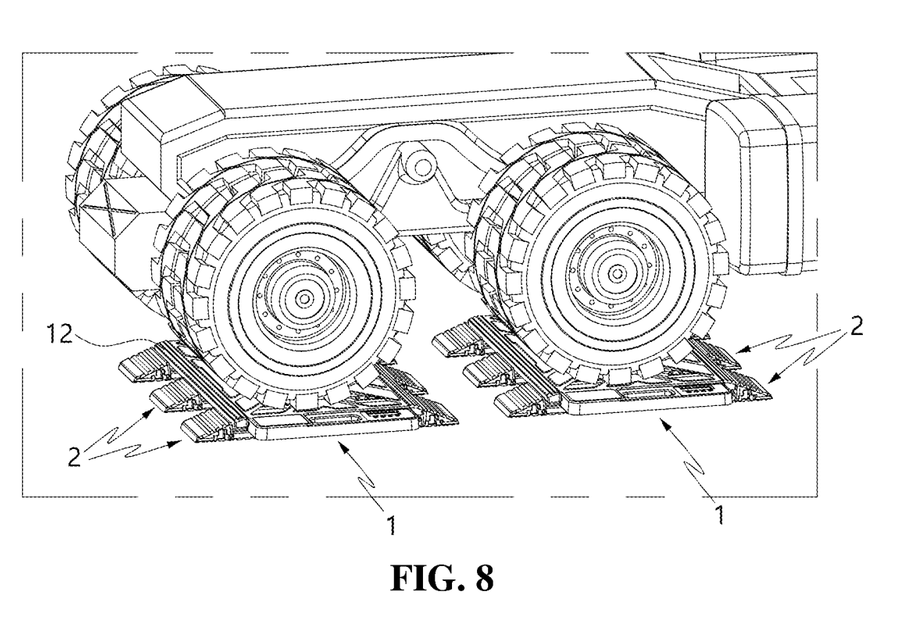
FIG. 8 is a perspective view showing the state of use for explaining the operation of the weight measuring apparatus for vehicles according to an embodiment of the present invention.

FIG. 8 is a perspective view showing the state of use for explaining the operation of the weight measuring apparatus for vehicles according to an embodiment of the present invention. As shown in the figure, the above described the weight measuring apparatus for vehicles is arranged according to the spacing of the wheels of the vehicle, and the vehicle is driven so that the wheels are placed on the upper plane of the measuring plate 1. At this time, the entry member 2 is coupled to contact the edge portion of the measurement plate body 11, having the inclined surface 21b formed in it, which may make the wheels move naturally, and prevent the measurement plate 1 from being scattered by the force happened while entering. It is also possible for the wheels to enter stably without occurring an overrun.

In addition, the bottom plane of the measuring plate 1 is not supported in close contact with the installation surface but is supported by the entry members 2 that are installed apart from each other at regular distance. Therefore, if there are irregularities or foreign substances on the bottom surface to be installed on, the weight measuring apparatus for vehicles can be installed with avoiding the irregularities and foreign substances. And it is possible to prevent damage or deformation that may occur due to load put to one side from tilting of the measuring plate 1, and since the object to be measured is stably supported, it is possible to accurately measure the weight.

When the wheel enters the upper surface of the measuring plate 1 through the entry part 21 of the entry member 2 as described above, the load is measured and displayed with a method similar to the general load measurement method of the weight measuring apparatus for vehicles. More specifically, as shown in FIG. 4 and FIG. 6, since the measuring plate 1 is coupled to the other side p2 of the load cell 3 via a fastening member 9 that is fastened to the second cell fastening hole 34, the load occurred when a vehicle enters is transferred to the load cell 3, which causes elastic deformation of the load cell 3, and subsequently an electrical signal corresponding the amount of deformation is transmitted to the controller 4. The controller 4 calculates the load value based on the transmitted electrical signal and displays it on the display unit 6 so that the user can recognize it.

On the other hand, as shown in FIG. 4, the weight measuring apparatus for vehicles according to an embodiment of the present invention has a structural feature in which since not only the load cell 3 is arranged to face each other to be located on the same axis line, but also the load cell 3 is installed in the load cell accommodation part 23 provided in the supporting part 22 deeply drawn into the lower part of the measuring plate 1, the distance between load cells (the distance between the inner ends of both opposing load cells) becomes shorter. In this way, if the separation distance between the load cells becomes shorter, the supporting force of measuring plate 1 against the load can be retained even if the thickness of the measuring plate 1 is relatively thin. In addition, there is advantage that since it has the structure supported by the supporting part 22 drawn into the inside of the measuring plate 1, the supporting structure is stable. Therefore, it is possible to easily produce in a casting method by using an aluminum (Al) casting material, which is relatively inexpensive, without increasing the thickness of the measuring plate or using an expensive rolled steel plate having excellent rigidity as in the prior art, thereby reducing manufacturing cost. In addition, as the measuring plate is made of light aluminum (Al) casting material, etc., the structure thereof is concise, simplified, and as the weight is minimized, it is easy to move, store, and install, thereby improving usability and handling.

In addition, as shown in FIG. 6, the weight measuring apparatus for vehicles according to an embodiment of the present invention comprises safety limiter member 11a to be provided with the gap for buffering d2 on a position of the bottom plane of the measuring plate 1 corresponding to the upper surface of one side p1 of the load cell 3, and thus there is an advantage that even if an excessive load is abnormally applied to the upper plane of the measuring plate 1, the deformation and damage of the load cell 3 can be reduced by the displacement absorption action by the gap for buffering d2 and the supporting action by the safety limiter member 11a.

Although the configuration and operation of the weight measuring apparatus for vehicles according to an embodiment of the present invention has been described above, it is an example, and any of those skilled in the art will understand that it is possible to substitute and modify some of the above-described embodiments within the range of not departing from the technical spirit of the present invention.

Therefore, the protection scope of the present invention should be understood to affect the invention described in the claims and its equivalents.

What is claimed is:

1. A weight measuring apparatus for vehicles, comprising:
a measuring plate on which an object to be measured is to be placed;
a plurality of entry members disposed on the measuring plate; and
a load cell having one side fixed to each of the plurality of entry members and another side fixed to the measuring plate,
wherein the plurality of entry members are placed apart from each other at an edge of the measuring plate,
wherein each of the plurality of entry members includes an entry part having a slope for entry of the object to be measured, a supporting part extended from the entry part and located on a lower part of the measuring plate, and having a bottom fixing hole, and a load cell accommodation part formed concavely on an upper part of the supporting part to accommodate the one side of the load cell,
wherein the load cell accommodation part includes a load cell seating place formed in an area where the bottom fixing hole is placed so that the one side of the load cell is seated, and an operating groove part adjacent to the load cell seating place and formed concavely so as to form a displacement gap for the load cell,
wherein the measuring plate includes a protruded stopper protruded from an edge end of a body of the measuring plate, and an upper fixing hole formed thereon to which the another side of the load cell is fixed, and
wherein the entry part includes a non-slip groove recessed in the slope, and a protrusion seating part recessed such that the protruded stopper is seated thereon.

2. The weight measuring apparatus for vehicles of claim 1,
wherein the measuring plate further includes:
a plurality of reinforcing protrusion parts protruded from a bottom plane of the measuring plate to increase rigidity while minimizing thickness thereof;
a fixing hole bottom reinforcing part protruded from a bottom plane of an area where the upper fixing hole is formed;
a fixing hole upper reinforcing part protruded from an upper plane of the area where the upper fixing hole is formed; and
an auxiliary non-slip part formed at an edge area of the measuring plate to be corresponding to the entry part.

3. The weight measuring apparatus for vehicles of claim 2,
wherein the measuring plate further includes a rim part protruded from the bottom plane of the measuring plate and having an outlet, and a storage part having a cover member coupled to the rim part.

4. The weight measuring apparatus for vehicles of claim 1, further comprising:
a load cell damage prevention part formed on the measuring plate to prevent deformation or damage of the load cell when an excessive load is applied to an upper plane of the measuring plate.

5. The weight measuring apparatus for vehicles of claim 1,
wherein the load cell includes a bar-shaped elastic body and a hollow formed in a center of the bar-shaped elastic body, and wherein the load cell further includes a first cell fastening hole and a second fastening hole formed thereon to be placed opposite to each other with respect to the hollow.

6. The weight measuring apparatus for vehicles of claim 1, wherein each of the plurality of entry members includes a non-slip pad disposed on a bottom plane thereof.

7. The weight measuring apparatus for vehicles of claim 1, further comprising:
    a controller configured to calculate a weight value based on an electric signal output from the load cell;
    a user interface configured to receive a user input and send a user input signal to the controller;
    a display unit configured to display data calculated by the controller; and
    a power supply configured to supply electric power to the load cell, the controller, the user interface, and the display unit.

8. The weight measuring apparatus for vehicles of claim 1, further comprising:
    a load cell damage prevention part formed on the measuring plate to prevent deformation or damage of the load cell when an excessive load is applied to an upper plane of the measuring plate,
    wherein the load cell includes a bar-shaped elastic body and a hollow formed in a center of the bar-shaped elastic body, and
    wherein the load cell further includes a first cell fastening hole and a second fastening hole formed thereon to be placed opposite to each other with respect to the hollow.

9. The weight measuring apparatus for vehicles of claim 4, wherein the load cell damage prevention part includes a safety limiter member formed on the measuring plate so that a gap for buffering is provided between the measuring plate and an upper plane of the one side of the load cell.

* * * * *